US010405272B2

(12) United States Patent
Chakraborty et al.

(10) Patent No.: US 10,405,272 B2
(45) Date of Patent: Sep. 3, 2019

(54) METHOD AND APPARATUS FOR REDUCING CELL SITE POWER CONSUMPTION IN A WIRELESS NETWORK

(71) Applicant: AT&T Intellectual Property I, L.P., Atlanta, GA (US)

(72) Inventors: Soumyajit Chakraborty, Harrison, NJ (US); Shiv Kumar, Marlboro, NJ (US); Michael John Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

(21) Appl. No.: 15/339,503

(22) Filed: Oct. 31, 2016

(65) Prior Publication Data
US 2017/0048794 A1 Feb. 16, 2017

Related U.S. Application Data

(63) Continuation of application No. 14/081,968, filed on Nov. 15, 2013, now Pat. No. 9,485,723.

(51) Int. Cl.
*H04W 24/02* (2009.01)
*H04W 52/02* (2009.01)

(52) U.S. Cl.
CPC ....... *H04W 52/0203* (2013.01); *H04W 24/02* (2013.01); *Y02D 70/00* (2018.01); *Y02D 70/1224* (2018.01); *Y02D 70/1242* (2018.01); *Y02D 70/1244* (2018.01); *Y02D 70/1262* (2018.01); *Y02D 70/142* (2018.01); *Y02D 70/146* (2018.01)

(58) Field of Classification Search
CPC ...... H04W 28/00; H04W 52/00; Y02D 70/00; Y02D 70/40
USPC ........................................ 455/405
See application file for complete search history.

(56) References Cited

U.S. PATENT DOCUMENTS

| | | | |
|---|---|---|---|
| 6,580,899 B1 | 6/2003 | Dalgleish et al. | |
| 8,149,777 B2 | 4/2012 | Kang | |
| 8,233,418 B2 | 7/2012 | Gupta | |
| 8,412,272 B2 | 4/2013 | Fischer | |
| 8,532,045 B2 | 9/2013 | Buddhikot et al. | |
| 2010/0273517 A1* | 10/2010 | Pinheiro | H04B 1/036 455/522 |
| 2011/0002253 A1 | 1/2011 | Cha et al. | |
| 2011/0183704 A1 | 7/2011 | Moreno et al. | |
| 2012/0058796 A1 | 3/2012 | Miyabayashi et al. | |

(Continued)

OTHER PUBLICATIONS

Peng, Chunyi, et al. "Traffic-driven power saving in operational 3G cellular networks." *Proceedings of the 17th annual international conference on Mobile computing and networking.* ACM, 2011.

(Continued)

*Primary Examiner* — Thomas J Lett

(57) ABSTRACT

A method, computer-readable storage device, and an apparatus for reducing power consumption in a wireless network are disclosed. For example, the method performs an analysis of a usage pattern for a cell site, determines whether a threshold is reached for reducing the power consumption based on the analysis of the usage pattern, and reduces the power consumption when the threshold is reached for reducing the power consumption.

18 Claims, 3 Drawing Sheets

(56) References Cited

U.S. PATENT DOCUMENTS

| | | |
|---|---|---|
| 2012/0063317 A1 | 3/2012 | Muraoka et al. |
| 2012/0108245 A1* | 5/2012 | Zhang .................. H04W 28/08 455/443 |
| 2012/0165063 A1 | 6/2012 | Scalia et al. |
| 2012/0307756 A1 | 6/2012 | Collings et al. |
| 2012/0282899 A1 | 11/2012 | Tanaka et al. |
| 2012/0329449 A1 | 12/2012 | Das et al. |
| 2013/0130690 A1 | 5/2013 | Hunukumbre et al. |
| 2013/0183928 A1 | 7/2013 | Scarr et al. |
| 2013/0194989 A1 | 8/2013 | Centonza et al. |
| 2013/0294272 A1 | 11/2013 | Xiao et al. |

OTHER PUBLICATIONS

Oh, Eunsung, Kyuho Son, and Bhaskar Krishnamachari. "Dynamic Base Station Switching-On/Off Strategies for Green Cellular Networks." (2013): 1-11.

* cited by examiner

METHOD AND APPARATUS FOR REDUCING CELL SITE POWER CONSUMPTION IN A WIRELESS NETWORK

This application is a continuation of U.S. patent application Ser. No. 14/081,968, filed Nov. 15, 2013, now U.S. Pat. No. 9,485,723, which is herein incorporated by reference in its entirety.

The present disclosure relates generally to wireless networks and, more particularly, to a method, computer-readable storage device, and apparatus for reducing power consumption by cell sites in a wireless network, e.g., a long term evolution (LTE) based wireless network.

BACKGROUND

A customer's ability to access wireless services that are provided by a network service provider, e.g., a wireless service provider, is dependent on the availability of capacity in the wireless network. For example, the wireless service provider needs to provide cellular coverage by deploying various network elements, e.g., base station subsystems, cell site equipment, and so on. In order to provide improved cellular coverage and performance, the wireless service provider may deploy a large number of cell sites, e.g., macro and metro cell sites.

However, having a large number of cell sites increases the wireless service provider's capital and operational expenditures. For example, a contributor to the operational expenditures of the wireless service provider is an expenditure associated with power consumption by the deployed cell sites.

SUMMARY OF THE DISCLOSURE

In one embodiment, the present disclosure describes a method, computer-readable storage device, and an apparatus for reducing a power consumption in a wireless network. For example, the method performs an analysis of a usage pattern for a cell site, determines whether a threshold is reached for reducing the power consumption based on the analysis of the usage pattern, and reduces the power consumption when the threshold is reached for reducing the power consumption.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
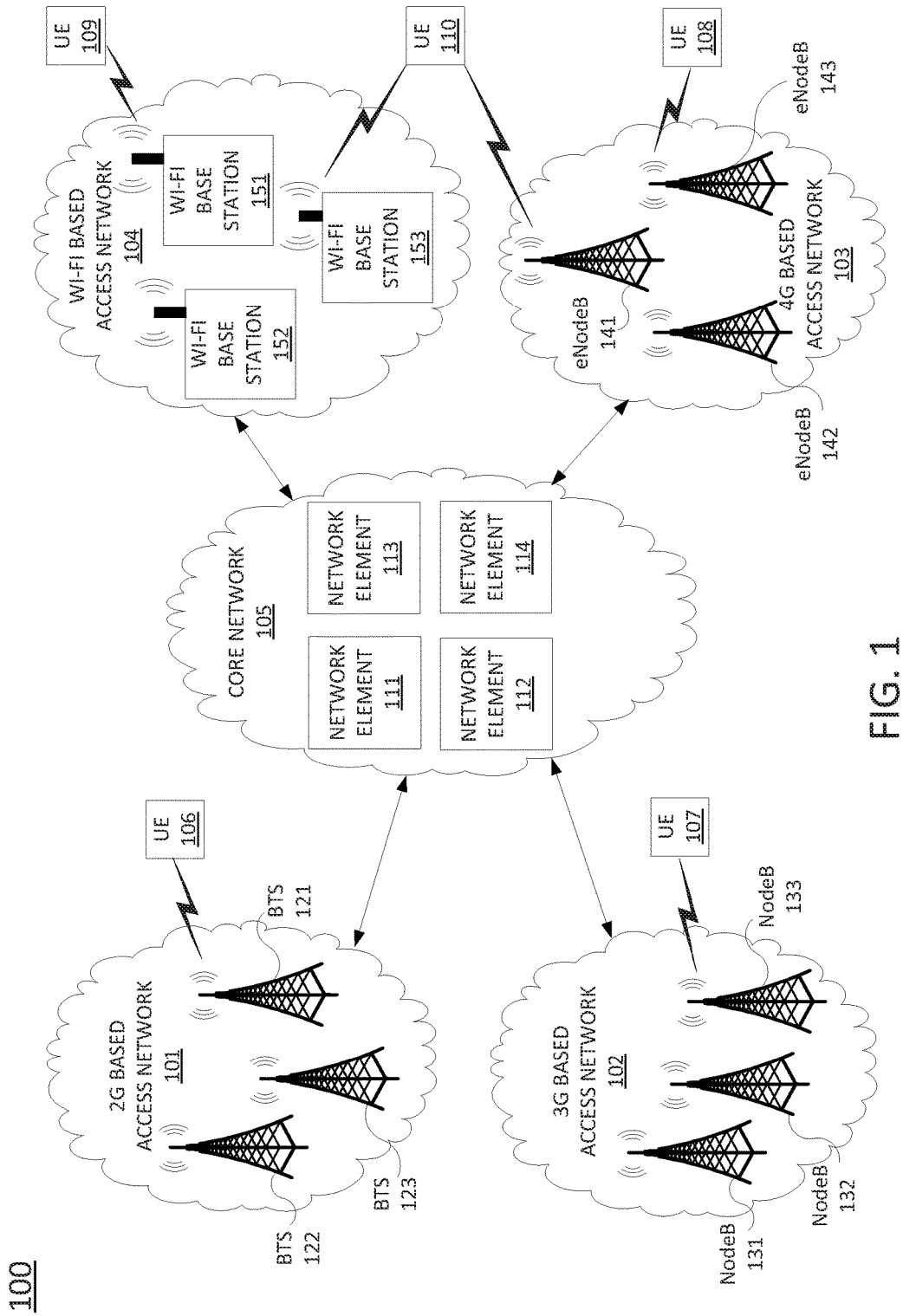
FIG. 1 illustrates an exemplary network related to the present disclosure.

The present disclosure broadly describes a method, computer-readable storage device and apparatus for reducing power consumption by cell sites in a wireless network. Although the teachings of the present disclosure are discussed below in the context of a long term evolution (LTE) based wireless network, the teaching is not so limited. Namely, the teachings of the present disclosure can be applied for other types of wireless networks (e.g., 2G network, 3G network, wireless fidelity (Wi-Fi) network, WiMax, and the like), wherein reducing power consumption by cell sites is beneficial.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

The wireless network, e.g., the 3G network, may also be divided hierarchically, based on a desired coverage area. In one example, cells in a wireless network may provide coverage for a small area with a high density of users. In another example, the cells may provide coverall for a large area with a low density of users, etc. For example, a 3G network may be divided into macro cells, micro cells, pico cells, etc. A macro cell refers to a cell that provides coverage for a large area, e.g., 1-10 km, using antennas of height that are taller than an average rooftop. The antenna for a macro cell may reach or exceed 30 meters. Micro cell refers to a much smaller cell that provides coverage for smaller area, e.g., less than 1 km, using antennas that are below rooftop level. The antenna height for a micro cell may reach about 10 m. The micro cell may be embedded within a macro cell. A pico cell provides coverage for a smaller area as compared to that of a micro cell. For example, the coverage area of a pico cell may be 100 m, 200 m, etc. A pico cell may be appropriate for a hot spot, e.g., at an airport, a hotel, etc. The pico cell may be embedded in a micro cell or a macro cell.

A wireless service provider may then provide services via a variety of wireless technologies, e.g., Wi-FI, 2G, 3G, 4G, etc. The types of wireless technologies deployed in an area may depend on types of services, classes of services, demand variations among the types of services and density of users, etc.

FIG. 1 illustrates an exemplary network 100 related to the present disclosure. In one illustrative embodiment, the network 100 comprises wireless access networks 101-104, a core network 105 and user endpoint devices 106-110. The wireless access network 101 is based on the 2G network technology. The wireless access network 102 is based on the 3G network technology. The wireless access network 103 is based on the 4G network technology. The wireless access network 104 is based on the Wi-Fi network technology.

The wireless access network 101 comprises the base transceiver stations (BTSs) 121-123. The wireless access network 102 comprises Node Bs 131-133. The wireless access network 103 comprises eNodeBs 141-143. The wireless access network 104 comprises Wi-Fi base stations 151-153.

The user endpoint devices 106-110 can be a smart phone, a cellular phone, a computer or laptop, a computing tablet, or any endpoint communication devices equipped with wireless capabilities. The user endpoint devices 106, 107, 108 and 109 access services via access networks 101, 102, 103 and 104, respectively. The user endpoint device 110 may access services either via the Wi-Fi based access network 104 or the 4G based access network 103.

The core network 105 comprises various network elements 111-114 and provides various functions that support wireless services. For example, user data packets may originate at a user endpoint, traverse one access network, traverse the core network, and may be forwarded towards a destination via another access network. In addition to routing and forwarding user data packets, network elements 111-114 in the core network 105 may act as, mobility anchors for the user plane during handovers, and as anchors for mobility among wireless technologies (such as among 2G, 3G, 4G and Wi-Fi technologies).

In one embodiment, network elements in the core network may also be responsible for UE (User Equipment) tracking and paging (e.g., such as retransmissions), bearer activation and deactivation process, selection of a serving gateway, authentication of a user, providing information about the subscriber's location, supporting accesses to subscriber databases and specialized functions of a charging system, providing public data gateways, providing subscription related information (profiles), etc.

In order to provide improved cellular coverage, the wireless service provider may deploy a large number of cell sites. For example, the service provider may deploy a variety of macro cell sites based on various types of wireless technologies. For instance, FIG. 1 illustrates wireless access networks 101-103 that comprise macro cell sites that are based on 2G, 3G and 4G technologies, respectively. In addition, the service provider may deploy a variety of micro cell sites. For instance, FIG. 1 illustrates an access network 104 that comprises micro cell sites that are based on Wi-Fi technology. The service provider may then be managing a large number of cell sites. Each cell site has associated capital and operational expenditures. One primary contributor to operational expenditure is expenditure for power delivery to the cell towers.

One approach to reduce power consumption by cell sites is to have the base stations go to a sleep mode when the base stations are not in use. However, there may be federal regulations that require coverage at all times. For example, in case of emergencies, a large number of emergency calls may be originated in an area. Thus, coverage for emergencies, e.g., to handle 911 calls, is regulated and needed.

Another approach is to enable the carrier (service provider) to power down the cell towers when not in use. However, once powered down, placing the cell tower back in operation may take an unacceptable amount of time. In addition, the towers may need to continue signaling for synchronization purposes. Thus, for realistic scenarios, having a solution that needs the entire tower to be powered down or a solution that has the base stations going to sleep may not be viable.

In one embodiment, the present disclosure provides an adaptive method for reducing power consumption by cell sites. The method provides a reduction in power consumption based on an analysis of usage patterns. The method may be implemented without requiring that entire cell towers be powered down, base stations be placed in a sleep mode, or the coverage area not being in compliance with regulations.

The method, described below, takes advantage of the fact that a portion of the power consumption is due to mobile user traffic, another portion is due to power consumption by the cellular network itself. For example, a cell site may transmit radio signals on its operating frequencies regardless of whether there is network traffic that necessitates the transmission of the radio signal. In other words, the cell site is operating in an always-on-mode, regardless of the level of network capacity that is needed to support the actual network traffic.

In addition, in order to operate in an always-on-mode for all traffic scenarios, the service provider may be designing the network for the worst case scenarios. For example, the network may be designed for maximum demand. However, for realistic scenarios, the network traffic varies significantly. For example, a variation of the network traffic may be based on a time of day, a day of week, a geographical location, a special event (e.g., a sport event such a football game on Sunday at a stadium, an entertainment event such as a musical concert at a local park on a Saturday afternoon, etc.), a weather condition (e.g., a hurricane sweeping over an area and disrupting power to land lines), and so on. Moreover, the variation of the network traffic may not be the same for all classes of wireless services. For example, voice traffic may have a different variation as compared to data, etc. One location may have more business users, while another location has more residential users. Thus, the variation of network traffic for various classes of services (e.g., GSM voice, UMTS voice, High-Speed Downlink Packet Access (HSDPA) data, LTE data, Short Message Service (SMS) data), may depend on different factors and may be different at different times.

In order to take advantage of the variation in network traffic, the method of the present disclosure first performs an analysis of usage pattern for each cell site. For example, in one embodiment, the method may gather data for each location. For each location, the data that is gathered may include: inventory of cell sites, identifications of neighboring cell sites, inventory of types of technologies, traffic patterns for each cell site, and an aggregate traffic pattern for the location. The method may then use the data that is gathered to perform an analysis and to identify spatial and temporal variations. The method may then perform an analysis of overlaps of frequency transmissions for multiple network technologies, for multiple classes of services, and for mobile user behavior patterns. The method may then classify each of the cell sites based on the analysis of usage pattern of the cell site. For example, each cell site may be classified as a business use, residential use, commercial use, entertainment use, highway use, and the like based on the location of the cell site, historic and current usage patterns, user mobility patterns (e.g., temporal), types of sessions initiated for specific services, counts of sessions initiated for specific services, and so on.

In one embodiment, the method may determine a level of power management for the cell site based on the classification of the cell site. For example, for each cell site, the method may determine when to perform the reducing of power consumption. In another example, the method may determine a level of reduction of the power consumption.

In one embodiment, the analysis of usage pattern for each cell site is performed by dividing an analysis window of time into non-overlapping time intervals. Peak traffic load, average peak traffic load, etc., for each of the non-overlapping time intervals may then be determined. The usage pattern, for each of the non-overlapping time intervals may also include classes of service and classification of the cell site during the time interval. For example, in view of the proximity to an event venue (e.g., a stadium, a park, a theater, a concert hall and so on), classes of service may depend on a particular type of event, a particular season of the year, a day of the week, a time of day, etc. The analysis of usage pattern may then be based on various data attributes.

The method then determines if a threshold is reached for reducing power consumption based on the analysis of the usage pattern. For example, for each cell site, the method determines if a pre-determined threshold for reducing power consumption is reached. In one example, the analysis of the usage pattern for a particular cell site may indicate that the threshold for reducing power consumption is reached. In another example, the analysis of usage pattern may indicate that the threshold for reducing power consumption is not reached.

If the threshold for reducing power consumption is reached for a particular cell site, the method performs the power reduction. In one embodiment, the method performs the power reduction via one or more of: suppressing transmission over one or more selected frequencies, suppressing particular services over one or more selected frequencies, and/or reducing overlaps of coverage among a plurality of cell sites, as described below.

In one embodiment, the method performs the power reduction by suppressing transmission over one or more selected frequencies. For example, a service provider may provide services over multiple licensed radio frequency spectrum bands. In order to provide at least a minimum coverage, at least one frequency needs to be use for transmission. The method then determines a set of one or more frequencies that is needed to support all expected traffic while using a minimum amount of power, i.e., reducing power consumption to a point that is just sufficient to handle the expected amount of traffic. The method may then select the frequencies that are not part of the set of frequencies needed to meet the expected demand, while meeting the minimum coverage requirements, and suppress or turn off the frequencies that are selected. The set of frequencies that are not part of the set of frequencies to be used for transmission may also be referred to as "selected frequencies." The method then performs the suppressing of the transmitting of radio signals over one or more selected frequencies from among the multiple licensed radio frequency spectrum bands. Suppression of transmission over selected frequencies (broadly means that the selected frequencies are not used for transmission) reduces the capacity of the cell site while also reducing the power consumption. It is important to note that this approach enables the service provider to continue providing coverage, thereby enabling the service provider to comply with regulations as to coverage requirements.

The available frequency spectrum bands, for a service provider, may vary based on location. For example, a service provider may be allocated more frequency spectrum bands in one geographic location as compared to the allocation at another geographic location. The power consumption comprises both consumption associated with radio transmission and consumption associated with cooling. Various data rate services may be associated with varying levels of power consumption. For example, for a particular coverage level, lower data rate services, e.g., UMTS data, require lower transmit power as compared to the power consumption of LTE data services. In addition, the lower data rate services are associated with lower cooling requirements, as compared to the higher data rate services.

For example, a service provider may have five FDD (5 Mhz) channels and two LTE channels, and each of these frequencies may be deployed in every cell site of the service provider network. When a cell site transmits on all frequencies, it may consume 1400 W of power. The present method may perform an analysis to determine the transmission power needs, capacity, coverage, etc., for each deployed frequency. For example, an eNodeB may support 700 Mhz frequencies, Advanced Wireless Service (AWS) frequencies for LTE data services, and UMTS frequencies. The AWS frequencies are at about 2100 Mhz range and are short range. The AWS frequencies are mostly used to enhance coverage in urban or congested areas. In one example, based on the traffic pattern, the service provider may wish to suppress the AWS frequencies while the 700 Mhz frequencies continue to provide long range LTE data services. For example, if the eNodeB may be at a business location, the demand may be satisfied during non-business time intervals by the 700 Mhz frequencies. In another example, both the 700 Mhz and AWS frequencies may be suppressed and the demand may be satisfied by the UMTS frequencies. Thus, for each cell site, the suppressing of transmission over one or more selected frequencies may be performed in accordance with the spectrum bands available for the service provider and the usage pattern for that particular cell site.

In another embodiment, the method performs the power reduction by suppressing delivery of particular services (e.g., high data rates services) over certain frequencies. For example, the method may suppress a high capacity service, e.g., an LTE service, while maintaining lower capacity services. For example, a service provider may offer a plurality of classes of service for downlink data that comprise: LTE data with 15 mbps, HSDPA data with 3.6 mbps, UMTS with 384 kbps, GPRS data with 171 kbps, UMTS/GSM voice with 12.2 kbps, etc., in a same coverage area or collocated cell sites. Generally, offering a class of service implies that all lower classes of service (lower data rates) are also offered. For example, if a UMTS with 384 kbps class of service is offered, then the GPRS data with 171 kbps and the UMTS/GSM voice with 12.2 kbps are also offered, but the LTE data with 15 mbps and the HSDPA data with 3.6 mbps are not offered. Since a higher class of service, e.g., HSDPA needs to support all lower classes of service, for a specific level of coverage, higher classes of services (higher data rates) require more transmit power.

In one embodiment, the method of the present disclosure performs, for each cell site, the suppressing of delivery of particular services by finding the minimum power required to carry all traffic demand for each enabled class of service. For example, the method may determine a capacity (and associated power) that is required to meet the demand to support traffic for each class of service. The cell site may also be classified, as described above. For example, the classification may be based on location, usage patterns, types of sessions, events, time of day, day of week, etc. The method then performs the suppressing of delivery of particular services while meeting the demand for each class of service. For example, if both Wi-Fi and 4G networks are available at a location, the method may opt to suppress 4G services, while providing coverage to users via the Wi-Fi network if the Wi-Fi network is sufficient to provide the demand for each class of service.

Network service providers deploy cell sites assuming some overlap of coverage among neighboring cells. This is mainly to facilitate handover. For example, as a user moves from a location serviced via a first cell site to another location serviced via a second cell site, if adequate overlap is not provided, the handover may fail to occur. However, the power consumption of cell sites depends on the coverage area provided by each cell. For example, when the coverage area of each cell site in a network is small, there is a corresponding increase in handovers. The increase in handovers is associated with an increase in power consumption. Power consumption is then inversely related to the coverage area of each cell site. When the network traffic is low enough, there may be a reduced need for concern regarding adequacy of the capacity even when the users are mobile. Thus, a service provider may be able to reduce the overlaps of coverage, without increasing probabilities of call failures and/or disconnections.

In another embodiment, the method performs the power reduction by reducing overlaps of coverage among a plurality of cell sites. For example, the method may reduce the power consumption by removing overlaps of coverage during low traffic load. In one embodiment, a reducing of a coverage area may be performed in addition to reducing of the power consumption by suppressing certain frequencies. For example, the coverage area for a cell may be reduced in addition to suppressing transmission over a predetermined frequency spectrum. In another embodiment, the reducing of the coverage area may be performed in addition to reducing of the power consumption by suppressing delivery of particular services. For example, the coverage area may be reduced for a cell in addition to suppression on high data rate services, e.g., LTE data.

Once the power reduction is performed for a particular cell site, the method continues to monitor the usage pattern of the particular cell site. The usage pattern may indicate that a threshold for increasing the power is reached. For example, a threshold for removal of the various suppressions, described above, may be reached. For example, an algorithm for suppression of transmission on certain frequencies may be suspended or reversed, an algorithm for suppressing delivery of particular services may be suspended or reversed, or an algorithm for reducing overlaps of coverage may be suspended or reversed.

In one embodiment, the method of the present disclosure may be implemented in a base station. For example, each base station may be able to collect usage pattern, perform the analysis of usage pattern, and implement an adaptive method for reducing power consumption by the base station.

In one embodiment, the method of the present disclosure may be implemented in a controller or application server of an access network. The application server or controller may then instruct each cell site to reduce power consumption. The application server or controller may also instruct the cell site as to which suppression method to use for implementing the reducing of power consumption.

In one embodiment, the method of the present disclosure may be implemented in a core network. For example, a service provider may be providing services via a plurality of access networks. The service provider may then wish to implement the power reduction via an application server located in the core network. The application server may perform an analysis of usage pattern on all of the plurality of access networks and make decisions as to power reduction based on a view of the entire network. Each cell site of each access network may then receive instructions when a threshold is reached for reducing power consumption and when a threshold is reached for resuming normal power consumption. The instructions may comprise instructions as to which suppression method to use for implementing the power reduction. For example, the instruction may include a list of frequencies to suppress, a list of services to suppress, and so on.

Figure 2:
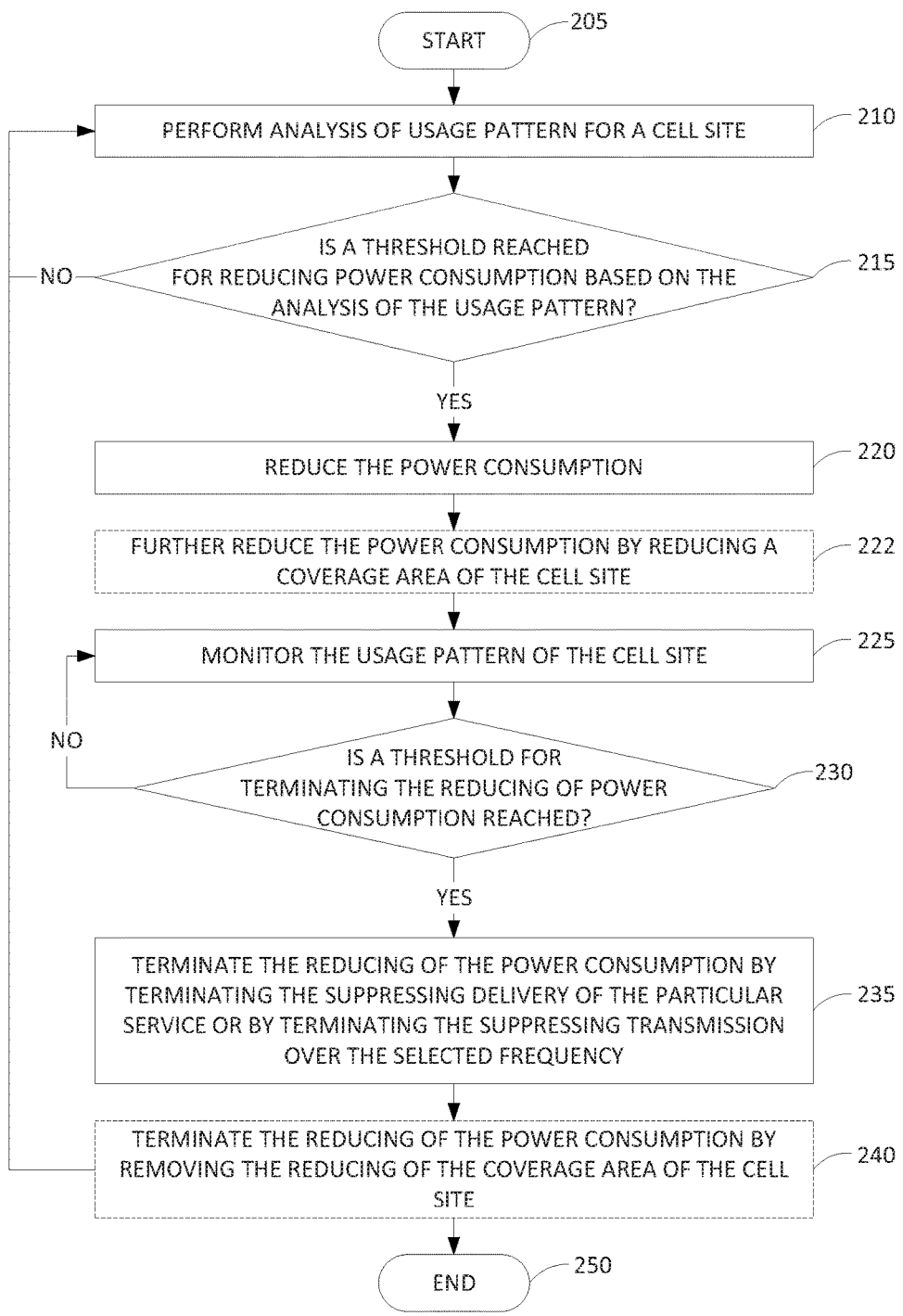
FIG. 2 illustrates a flowchart of a method for reducing power consumption by a cell site in a wireless network.

FIG. 2 illustrates a flowchart of a method 200 for reducing power consumption by a cell site. In one example, the method may be implemented in a base station. In another example, the method may be implemented in a controller or an application server of an access network. In yet another example, the method may be implemented in an application server located in a core network. The method can be implemented using a general purpose computer as discussed in FIG. 3. Method 200 starts in step 205 and proceeds to step 210.

In step 210, method 200 performs an analysis of usage pattern for a cell site. For example, the method may gather data for each location comprising one or more cell sites. For example, the data that is gathered may include: inventory of cell sites, identifications of neighboring cell sites, inventory of types of network technologies, traffic patterns for each cell site, and an aggregate traffic pattern for the location. The method may then use the data that is gathered to perform an analysis and to identify spatial and temporal variations. The method may perform an analysis of overlaps of frequency transmissions for multiple network technologies, for multiple classes of services, and for mobile user behavior patterns. The method may classify the cell sites based on the analysis of usage pattern, and determine a level of power management for each cell site based on the classification of the cell site. For example, for each cell site, the method may determine one or more thresholds for invoking the reducing of power consumption and for resuming normal consumption of power. In another example, the method may also determine a level of reduction of the power consumption.

In step 215, method 200 determine, for the cell site, if a threshold is reached for reducing power consumption based on the analysis of the usage pattern. For example, the method may determine if a pre-determined threshold for reducing power consumption is reached. If the threshold for reducing power consumption is reached, the method proceeds to step 220. Otherwise, the method proceeds to step 210 to continue performing the analysis of usage pattern, e.g., periodically (e.g., every 30 minutes or every hour) or continuously.

In step 220, method 200 reduces the power consumption. The method then proceeds to optional step 222.

In one embodiment, the reducing of the power consumption in step 220 is performed by suppressing transmission over one or more selected frequencies. In one embodiment, the reducing of the power consumption is performed by suppressing delivery of one or more particular services over one or more selected frequencies. In one embodiment, the reducing of the power consumption is performed by suppressing delivery of one or more particular services, e.g., over any frequency.

In one embodiment, the reducing of the power consumption in step 220 is performed via an algorithm that performs a combination of: suppressing transmission over one or more selected frequencies, suppressing delivery of one or more particular services, and suppressing delivery of one or more particular services over one or more selected frequencies. For example, the algorithm may perform a combination of the various approaches as discussed above to reduce power consumption.

In optional step 222, the method 200 further reduces the power consumption by reducing a coverage area of the cell site. For example, the coverage area for the cell site may be reduced in order to reduce overlaps of coverage areas by a plurality of cell sites.

In step 225, method 200 monitors the usage pattern of the cell site. For example, the method may monitor the usage pattern in order to determine if a threshold is reached for terminating the reducing of power consumption, i.e., resuming a normal or default power consumption level. For example, the method may monitor the usage pattern to determine if a threshold is reached for: removing suppressions of transmissions over the one or more selected frequencies, removing suppressions of delivery of the one or more services over the one or more selected frequencies, and removing the reduction of the coverage area.

In step 230, method 200 determines if a threshold for terminating the reducing of power consumption is reached. For example, the usage pattern may indicate that a threshold for increasing the power is reached. If the threshold for terminating the reducing of power consumption is reached, the method proceeds to step 235. Otherwise, the method returns to step 225.

In step 235, method 200 terminates the reducing of the power consumption. In one embodiment, the method may remove suppressions of transmissions over the one or more selected frequencies. In another embodiment, the method may remove suppressions of delivery of the one or more services over the one or more selected frequencies.

In optional step 240, method 200 terminates the reducing of the power consumption, by removing the reducing of the coverage area of the cell site. For example, the method increases the coverage area of the cell site, e.g., to provide an overlap of coverage. The method then either proceeds to step 210, to continue analyzing usage patterns, or to step 250 to end the method 200.

It should be noted that the above description has described certain network components to be deployed within the radio access network. However, in one embodiment if certain components of the radio access network are to be "virtualized" or provided as "cloud based" components, i.e., these components are physically deployed remote from the cell site, e.g., within a core network, then the above method for reducing power consumption for a cell site can be equally applied even when the relevant components are no longer deployed physically at the cell site. Said another way, the above method for reducing power consumption for a cell site can still be applied for a cloud based radio access network, but the power savings will occur at the core network versus at the location of the cell site.

Furthermore, an extension of the present disclosure is that as certain suppression techniques are applied to the cell site as disclosed above, there is often a corresponding effect, e.g., an "upstream" effect that will be experienced at the core network. In other words, with the suppression of certain services at the cell site, there may be a corresponding suspension of operations at some of the related network elements at the core network, i.e., the temporary idling or temporary reduction of processing operations for certain hardware network components or elements within the core network. In turn, these affected network elements at the core network can then also implement a power consumption reducing algorithm, thereby reducing power consumption at the core network as well.

Figure 3:
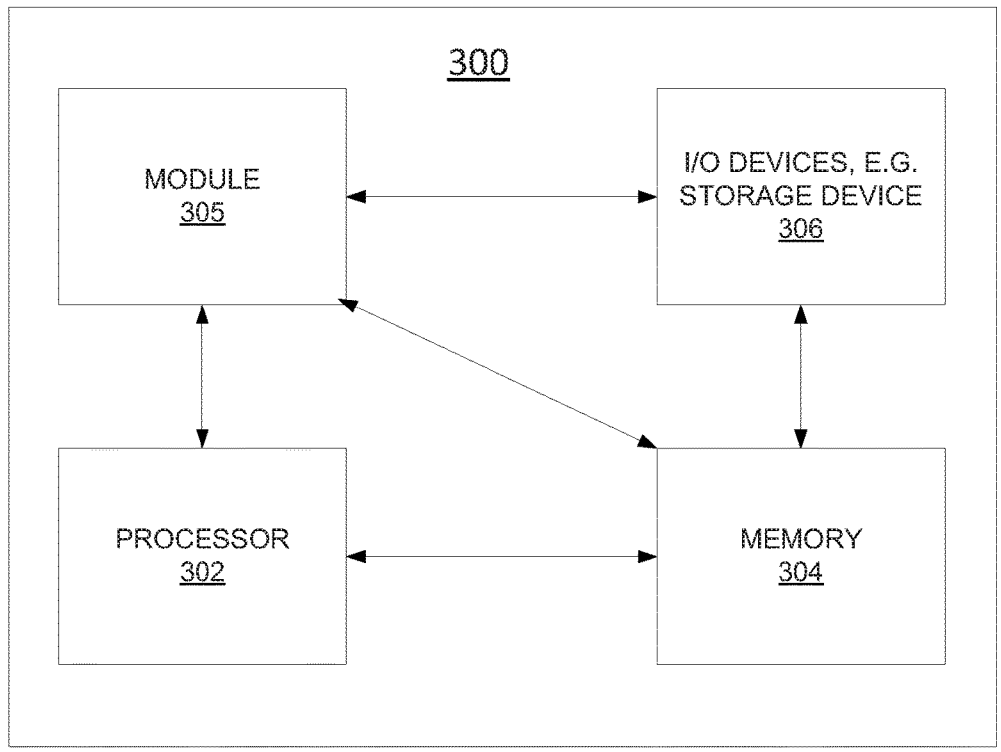
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for reducing power consumption by a cell site in a wireless network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for reducing power consumption by a cell site in a wireless network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for reducing power consumption by a cell site in a wireless network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reducing a power consumption in a wireless network, the method comprising:
   performing, by a processor, an analysis of a usage pattern for a cell site for a plurality of classes of wireless service;
   determining, by the processor, whether a threshold is reached for reducing the power consumption based on the analysis of the usage pattern, wherein the threshold comprises a level of a traffic load of the cell site, wherein the threshold is reached when the traffic load falls below the level; and
   reducing, by the processor, the power consumption when the threshold is reached for reducing the power consumption, wherein the reducing the power consumption is performed by suppressing a delivery of a particular class of wireless service of the plurality of classes of wireless service over a particular radio frequency spectrum band.

2. The method of claim 1, further comprising:
   monitoring the usage pattern of the cell site;
   determining whether a threshold for terminating the reducing the power consumption is reached in accordance with the monitoring of the usage pattern of the cell site; and
   terminating the reducing the power consumption when the threshold for terminating the reducing the power consumption is reached by terminating the suppressing of the transmission over the particular radio frequency spectrum band.

3. The method of claim 1, further comprising:
   monitoring the usage pattern of the cell site;
   determining whether a threshold for terminating the reducing the power consumption is reached in accordance with the monitoring of the usage pattern of the cell site; and
   terminating the reducing the power consumption when the threshold for terminating the reducing the power consumption is reached by terminating the suppressing of the delivery of the particular class of wireless service.

4. The method of claim 1, further comprising:
   further reducing the power consumption by reducing a coverage area of the cell site.

5. The method of claim 4, further comprising:
   monitoring the usage pattern of the cell site;
   determining whether a threshold for terminating the reducing the power consumption is reached in accordance with the monitoring of the usage pattern of the cell site; and
   terminating the reducing the power consumption when the threshold for terminating of the reducing the power consumption is reached by increasing the coverage area of the cell site.

6. The method of claim 1, wherein the particular class of wireless service comprises a data service of a particular rate.

7. A non-transitory computer-readable storage device storing a plurality of instructions which, when executed by a processor, cause the processor to perform operations for reducing a power consumption in a wireless network, the operations comprising:
   performing an analysis of a usage pattern for a cell site for a plurality of classes of wireless service;
   determining whether a threshold is reached for reducing the power consumption based on the analysis of the usage pattern, wherein the threshold comprises a level of a traffic load of the cell site, wherein the threshold is reached when the traffic load falls below the level; and
   reducing the power consumption when the threshold is reached for reducing the power consumption, wherein the reducing the power consumption is performed by suppressing a delivery of a particular class of wireless service of the plurality of classes of wireless service over a particular radio frequency spectrum band d.

8. The non-transitory computer-readable storage device of claim 7, the operations further comprising:
   monitoring the usage pattern of the cell site;
   determining whether a threshold for terminating the reducing the power consumption is reached in accordance with the monitoring of the usage pattern of the cell site; and
   terminating the reducing the power consumption when the threshold for terminating the reducing the power consumption is reached by terminating the suppressing of the transmission over the particular radio frequency spectrum band.

9. The non-transitory computer-readable storage device of claim 7, the operations further comprising:
   monitoring the usage pattern of the cell site;
   determining whether a threshold for terminating the reducing the power consumption is reached in accordance with the monitoring of the usage pattern of the cell site; and
   terminating the reducing the power consumption when the threshold for terminating the reducing the power consumption is reached by terminating the suppressing of the delivery of the particular class of wireless service.

10. The non-transitory computer-readable storage device of claim 7, the operations further comprising:
    further reducing the power consumption by reducing a coverage area of the cell site.

11. The non-transitory computer-readable storage device of claim 10, the operations further comprising:
    monitoring the usage pattern of the cell site;
    determining whether a threshold for terminating the reducing the power consumption is reached in accordance with the monitoring of the usage pattern of the cell site; and
    terminating the reducing the power consumption when the threshold for terminating of the reducing the power consumption is reached by increasing the coverage area of the cell site.

12. The non-transitory computer-readable storage device of claim 7, wherein the particular class of wireless service comprises a data service of a particular rate.

13. An apparatus for reducing a power consumption in a wireless network, the apparatus comprising:
    a processor; and
    a computer-readable storage device storing a plurality of instructions which, when executed by the processor, cause the processor to perform operations, the operations comprising:

performing an analysis of a usage pattern for a cell site for a plurality of classes of wireless service;

determining whether a threshold is reached for reducing the power consumption based on the analysis of the usage pattern, wherein the threshold comprises a level of a traffic load of the cell site, wherein the threshold is reached when the traffic load falls below the level; and reducing the power consumption when the threshold is reached for reducing the power consumption, wherein the reducing the power consumption is performed by suppressing a delivery of a particular class of wireless service of the plurality of classes of wireless service over a particular radio frequency spectrum band.

14. The apparatus of claim 13, the operations further comprising:

monitoring the usage pattern of the cell site;

determining whether a threshold for terminating the reducing the power consumption is reached in accordance with the monitoring of the usage pattern of the cell site; and terminating the reducing the power consumption when the threshold for terminating the reducing the power consumption is reached by terminating the suppressing of the transmission over the particular radio frequency spectrum band.

15. The apparatus of claim 13, the operations further comprising:

monitoring the usage pattern of the cell site;

determining whether a threshold for terminating the reducing the power consumption is reached in accordance with the monitoring of the usage pattern of the cell site; and terminating the reducing the power consumption when the threshold for terminating the reducing the power consumption is reached by terminating the suppressing of the delivery of the particular class of wireless service.

16. The apparatus of claim 13, the operations further comprising:

further reducing the power consumption by reducing a coverage area of the cell site.

17. The apparatus of claim 16, the operations further comprising:

monitoring the usage pattern of the cell site;

determining whether a threshold for terminating the reducing the power consumption is reached in accordance with the monitoring of the usage pattern of the cell site; and terminating the reducing the power consumption when the threshold for terminating of the reducing the power consumption is reached by increasing the coverage area of the cell site.

18. The apparatus of claim 13, wherein the particular class of wireless service comprises a data service of a particular rate.

* * * * *